(12) United States Patent
Fastert et al.

(10) Patent No.: US 10,189,215 B2
(45) Date of Patent: Jan. 29, 2019

(54) LAYING DEVICE AND A METHOD FOR THE LAYING DOWN OF FIBRE TAPES

(71) Applicant: Airbus Operations GmbH, Hamburg (DE)

(72) Inventors: Claus Fastert, Hamburg (DE); Paulin Fideu Siagam, Hamburg (DE); Hauke Seegel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 251 days.

(21) Appl. No.: 15/037,921

(22) PCT Filed: Nov. 19, 2014

(86) PCT No.: PCT/EP2014/075040
§ 371 (c)(1),
(2) Date: May 19, 2016

(87) PCT Pub. No.: WO2015/075079
PCT Pub. Date: May 28, 2015

(65) Prior Publication Data
US 2016/0288430 A1    Oct. 6, 2016

(30) Foreign Application Priority Data

Nov. 21, 2013  (DE) .................. 10 2013 223 851

(51) Int. Cl.
*B29C 70/38*   (2006.01)
*B29C 70/54*   (2006.01)
(Continued)

(52) U.S. Cl.
CPC .......... *B29C 70/388* (2013.01); *B29C 31/085* (2013.01); *B29C 70/386* (2013.01);
(Continued)

(58) Field of Classification Search
CPC ... B29C 70/382; B29C 70/384; B29C 70/386; B29C 70/388
See application file for complete search history.

(56) References Cited

U.S. PATENT DOCUMENTS

| 4,419,170 A | 12/1983 | Blad |
| 4,735,672 A * | 4/1988 | Blad ..................... B29C 70/382 |
| | | 156/361 |

(Continued)

FOREIGN PATENT DOCUMENTS

| DE | 102006011341 A1 | 9/2007 |
| EP | 1468791 A1 | 10/2004 |

OTHER PUBLICATIONS

State Intellectual Property Office of the People's Republic of China, Office Action in Chinese Patent Application No. 201480063656.6 dated Sep. 5, 2017.
(Continued)

*Primary Examiner* — Jeffry H Aftergut
(74) *Attorney, Agent, or Firm* — Lorenz & Kopf LLP

(57) ABSTRACT

Disclosed is a laying down device and method for the automated laying down of fiber tapes on a surface, wherein a creel is arranged on an independent positioning device that can be individually traversed in three dimensions, and tracks the movements of a laying head; also disclosed is a laying method.

8 Claims, 1 Drawing Sheet

(51) Int. Cl.
*B29C 31/08* (2006.01)
*B29L 31/30* (2006.01)

(52) U.S. Cl.
CPC .............. *B29C 70/54* (2013.01); *B29C 70/38* (2013.01); *B29L 2031/3076* (2013.01)

(56) References Cited

U.S. PATENT DOCUMENTS

| | | | |
|---|---|---|---|
| 8,151,854 B2* | 4/2012 | Oldani | B29C 70/382 |
| | | | 156/433 |
| 2005/0247396 A1 | 11/2005 | Oldani et al. | |
| 2006/0180264 A1* | 8/2006 | Kisch | B29C 70/32 |
| | | | 156/173 |
| 2006/0287769 A1 | 12/2006 | Yanagita et al. | |
| 2010/0200168 A1* | 8/2010 | Oldani | B29C 70/382 |
| | | | 156/441 |
| 2013/0092325 A1* | 4/2013 | Genssen | B29C 70/388 |
| | | | 156/580 |

OTHER PUBLICATIONS

International Searching Authority, Written Opinion of the International Searching Authority for International Patent Application No. PCT/EP2014/075040 dated Jul. 7, 2015.

* cited by examiner

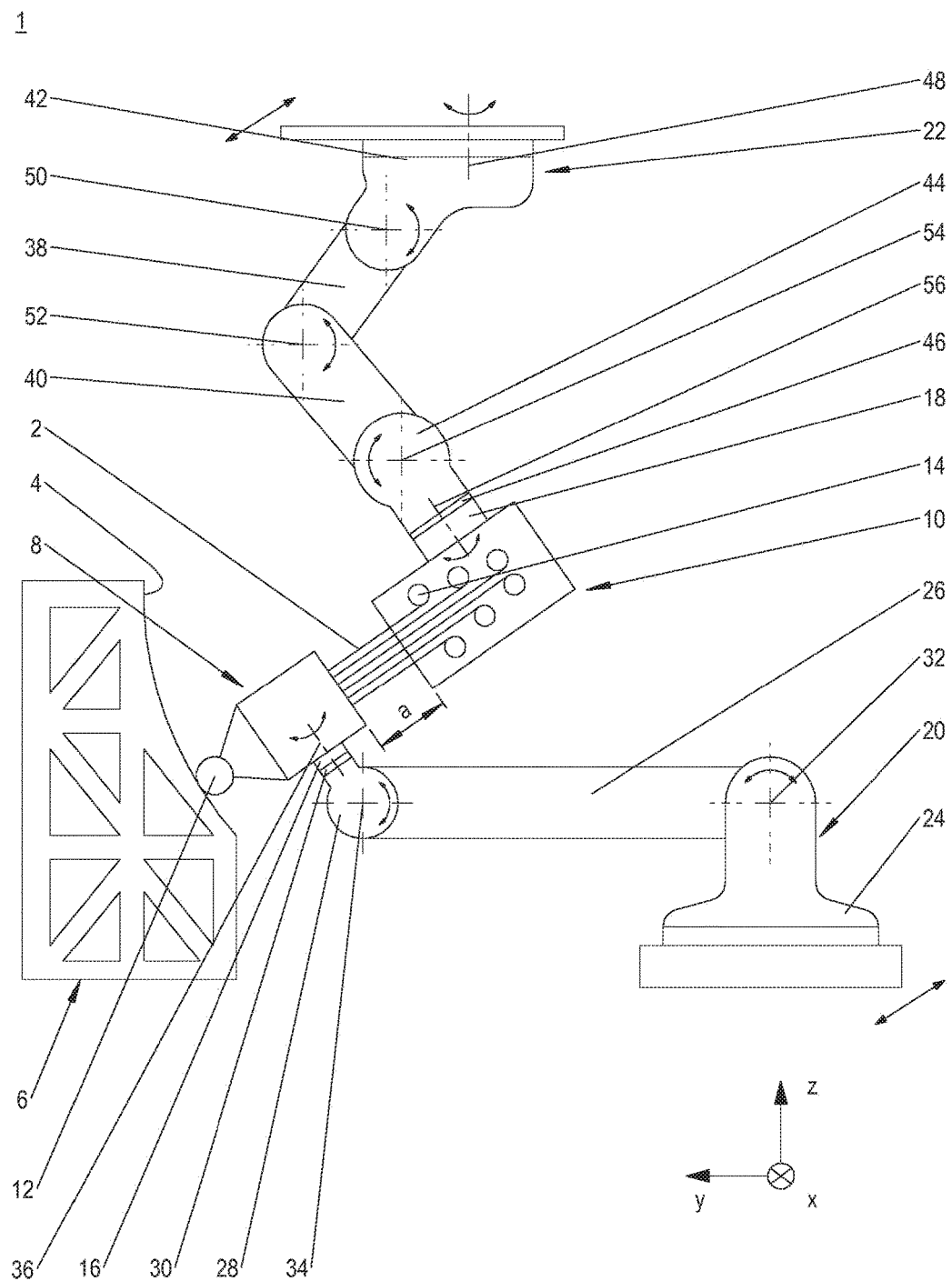

LAYING DEVICE AND A METHOD FOR THE LAYING DOWN OF FIBRE TAPES

CROSS-REFERENCE TO RELATED APPLICATIONS

This is a continuation of International Application No. PCT/EP2014/075040, filed Nov. 19, 2014, which application claims priority to German Application No. 10 2013 223 851.7, filed Nov. 21, 2013, which are hereby incorporated by reference in their entirety.

TECHNICAL FIELD

The embodiments described herein relate to laying down device for the automated laying down of fibre tapes on a surface and a method for the automated laying down of fibre tapes on a surface.

In lightweight structures, in particular in aircraft construction and in space travel, fibre-reinforced composite components are deployed to an increasing extent for a very wide variety of structural components; by virtue of their high strength with, at the same time, low mass, these have a high weight-saving potential.

Here the alignment of the reinforcement fibres in the composite component has a decisive influence on the mechanical properties, such as, for example, the stiffness and the load-bearing capacity. The reinforcement fibres should in the ideal case follow the definitive loading direction of the component, should have no waviness, and should be subjected as evenly as possible to mechanical loads.

One possibility for implementing the above requirements profile is offered by the so-called fibre placement method (FP method). Here fibre tapes, pre-impregnated with a thermoplastic or with a thermosetting plastic material, and reinforced with reinforcement fibres, with a width of between a few millimeters, for example approximately 3 mm, and several centimeters, for example 20 cm, are laid down by means of a robotically guided laying head along prescribed trajectories on a formative base. The laying process is repeated in an automated manner until the successively built up FP-blank or pre-form has achieved the desired geometry and material thickness. The automated laying process allows the reliable reproducibility of the geometrical dimensions of the fibre composite components that are being manufactured in large numbers with, at the same time, low manufacturing costs. The laying down of fibre tapes that have already been pre-impregnated by the manufacturer (so-called pre-preg tapes) preferably takes place along trajectories that ensure that the runs of the reinforcement fibres in the finished component are aligned with the force flow paths.

Further processing of the component takes place after the conclusion of the laying down process as a function of the plastic material deployed in the formation of the matrix. If the fibre tapes are, for example, formed with a curable thermosetting plastic material such as, for example, an epoxy resin, curing of the blank usually takes place with the application of pressure and/or temperature so as to complete the composite component. Fibre tapes impregnated with a thermoplastic plastic material during the laying process already require high temperatures of, for example, up to 450° C. in order to maintain sufficient flexibility of the fibre tapes. In the case of thermoplastic fibre tapes there are no further processing steps to be undertaken after completion of the fibre placement laying process; an active or passive cooling of the blank down to room temperature is sufficient. With thermoplastic fibre tapes, however, subsequent consolidation in an autoclave can also be necessary in some cases.

Instead of laying down pre-impregnated, or impregnated, fibre tapes, dry fibre tapes can also be laid down using the FP method; in such cases the pre-form thus generated can be filled with resin after the laying down process, using an injection or infusion method, and cured. Such FP methods are known as dry fibre placement methods, or direct tow placement methods.

The fibre tapes are usually wound onto spools, which are stored next to one another in so-called creels. In a laying device of known art the creel is attached to the laying head. Such a laying head features high weight and complex construction, whereby the complex construction renders the changeover of the spools more difficult.

In an alternative laying device the creel together with the laying head is arranged on a movable base platform. Here the creel is arranged at a distance from the laying head; this requires guidance of the fibre tapes over a multiplicity of tension rollers and deflection rollers. The guidance over the tension and deflection rollers takes place in an unprotected manner so that the fibre tapes are exposed to contamination. Moreover, warping or twisting of the fibre tapes can ensue, which can have a deleterious effect on the alignment of the fibre tapes in the laying head.

In another laying device of known art, in which a creel is positioned separately from the laying head in a lateral region of the device, the fibre tapes are guided through Bowden cable-type channels. While the channels fundamentally protect the fibre tapes from environmental effects, the channels themselves can become contaminated, and these contaminants can be deposited onto the fibre tapes. Moreover the system of channel guidance is technically complex.

An object of the embodiment is to create a laying down device for the automated laying down of fibre tapes on a surface, which, independently of any particular laying head position, enables a short distance to be maintained between the laying head and a creel, and also a simple changeover of the creel. Furthermore it is an object of the embodiment to create a method for the automated laying down of fibre tapes on a surface.

An laying device for the automated laying down of fibre tapes on a surface has a laying head mounting arranged on a positioning device, for purposes of accommodating a laying head, and a creel mounting for purposes of accommodating a creel. In accordance with the embodiment, the creel mounting is arranged on an individually controllable and traversable positioning device, by means of which movements of the laying head can be tracked.

By means of the individual arrangement of a laying head and a creel, in combination with the tracking of the movements of the laying head mounting, and thus of the laying head, a constant, and in particular a minimum, distance between the creel and the laying head can always be set. By virtue of a relative position between the creel and the laying head that does not alter, as a result of the individual mounting and tracking control of the creel with respect to the laying head, guidance of the fibre tapes can be technically simplified, that is to say, separate tension rollers, deflection rollers and similar can be omitted. Contamination of the fibre tapes as a result of environmental effects is reduced to a minimum, or excluded altogether, even without complex channel guides. At the same time the creel can be tracked such that undesirable twisting of the fibre tapes is excluded, so that the fibre tapes are supplied to the laying head in an optimal alignment. Moreover any changeover of the creel is simplified, since the creel mounting is decoupled, i.e. separated, from the laying head, and thus good access is provided.

The laying device can have a plurality of creel mountings. By this means the laying device can for example be populated simultaneously with creels of differing fibre tape widths, so that in the laying process a changeover can be made between individual fibre tape widths with hardly any interruption. Alternatively and/or additionally the laying device can be populated with a plurality of creels with the same fibre tape widths, so that after the consumption of one creel a full creel can be accessed with hardly any interruption.

In one example of an embodiment, a plurality of creel mountings are arranged on individually controllable positioning devices. By this means the flexibility of the laying device can be further increased. Thus, for example, in the course of the laying process an empty creel, which is arranged on its own positioning device, can be changed over for a full creel without any interruption of the laying process. Moreover during a laying process the laying device can be made ready for a subsequent laying process and populated with the appropriate creels.

The changeover of the creels can be automated if at least one changeover device is provided, by means of which the at least one creel is removed from its mounting and the latter can be repopulated with a new or alternative creel.

The changeover process can be improved further if the positioning device in question can be traversed into an appropriate changeover position.

In one embodiment the at least one positioning device of the at least one creel mounting is a jointed arm robot. Such a robot features the maximum degrees of freedom in its movement, so that even in the case of highly complex spherical surfaces the creel can follow the laying head at a very close distance.

In an alternative embodiment the at least one positioning device of the at least one creel mounting is a portal robot. Such a robot requires less complex control and regulation electronics than a jointed arm robot.

The positioning device associated with the creel preferably has at least one more degree of freedom than the positioning device associated with the laying head. By this means the positioning device associated with the creel can be erected on a surrounding section almost independently of the positioning device associated with the laying head, since as a result of the at least one more degree of freedom compensation can be made for different erection sites.

In an exemplary embodiment, a method for the automated laying down of fibre tapes on a surface, in particular for purposes of controlling an inventive laying device, a laying head and a creel are arranged on individually controllable positioning devices, and the positioning device of the creel is controlled, i.e. is moved in space, such that the creel tracks the movements of the laying head.

The method enables a small distance to be maintained between the laying head and the creel, in addition to a simple creel changeover. As seen from the surface the creel is arranged immediately behind the laying head, as a result of which the fibre tapes are only guided over a small open distance between the creel and the laying head.

BRIEF DESCRIPTION OF THE DRAWINGS

The various embodiments will hereinafter be described in conjunction with the following drawing figures, wherein like numerals denote like elements, and:

FIG. 1 is a schematic representation of a laying device 1 for the automated laying down of fibre tapes 2 on a surface 4 for purposes of building up a composite component. Here the surface 4 is formed by a moulding tool, which, for example, portrays a fuselage shell of an aircraft structure. Accordingly, here the exemplary composite component that is being produced is a fuselage shell.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

In this embodiment the moulding tool 6 is mounted in a stationary manner and extends principally in the x-direction and z-direction in terms of the coordinates system shown in FIG. 1. Needless to say, the moulding tool 6 can also be mounted such that it can be traversed in a plane, or in three dimensions.

The laying device 1 enables execution of the so-called fibre placement method (FP method), in which the fibre tapes 2 are laid down onto on the surface 4 in trajectories that are aligned with the force flow paths relevant to the composite component that is to be produced. In the interests of clarity one fibre tape 2 is allotted a number as a representative for all the fibre tapes.

The fibre tapes 2 are, for example, so-called pre-preg tape materials. Alternatively, however, the fibre tapes 2 can also be dry fibre tapes. The laying device 1 is thus not limited either to just the laying down of pre-pregs, or just the laying down of dry fibre tapes. The laying device 1 is independent of the degree of impregnation of the fibre tapes, and thus allows for the manipulation of both pre-pregs and also dry fibre tapes. They are preferably reinforced with carbon fibres, which are embedded into a plastic matrix of either a thermoplastic or a thermosetting plastic material. Alternatively any organic and/or inorganic reinforcement fibres can also be deployed, as long as a prescribed mechanical load capacity is provided by the composite component produced using the FP method. In the case of a thermoplastic resin matrix it can be necessary, depending upon the specific material properties of the thermoplastic plastic, to heat the fibre tape 80 up to a temperature of approximately 450° C., for example by means of a laser beam, in order to ensure its flexibility and manipulability during the FP method.

The laying device 1 has a laying head 8 and at least one creel 10. The laying head 8 allows the laying down of fibre tapes 2 that differ both with regard to their materials, and also with regard to their thickness and width.

The laying head 8 has a pressure application roller unit 12 for purposes of pressing the fibre tapes 2 onto the surface 4, guides for purposes of introducing the fibre tapes 2 from the creel into the laying head 8, a cutting device for purposes of cutting the fibre tapes 2 to size, and a heating device for purposes of optional heating of the fibre tapes 2 up to an operating temperature. The pressure application roller unit 12, the guides, the cutting device and the heating device are of conventional types, wherein for reasons of clarity they are not represented.

The creel 10 has a multiplicity of spools 14, each of which can accommodate a fibre tape 2. The spools 14 are mounted in the creel 10 on parallel spool axes that are not shown. Here they are arranged such that the fibre tapes 2 are led out of the creel 10 parallel to one another and preferably in one plane.

For purposes of changing over the creel 10, for example, for purposes of exchanging an empty creel for a full creel, the laying device 1 has a changeover device that is not shown.

The laying head 8 and the creel 10 are in each case arranged by means of a laying head mounting 16 and a creel mounting 18 respectively of the laying device 1 on an independently, i.e. individually, controllable and traversable positioning device 20, 22. The positioning devices 20, 22 allow the laying head 8 and the creel 10 to be positioned freely in three dimensions, and thus with respect to the surface 4 of the moulding tool 6. In this example of embodiment the positioning devices 20, 22 are embodied as arm robots. In particular, the positioning device 22 associated with the creel is here embodied as a jointed arm robot, and has, as is seen in what follows, at least one more degree of freedom than the positioning device 20 associated with the laying head. However, the positioning devices 20, 22 can also be portal robots. The individual arrangement of the laying head 8 and the creel 10 on independently controllable positioning devices 20, 22 with multiple degrees of freedom enables the tracking of movements of the laying head 8 by the creel 10, and thus an unaltered relative position between the laying head 8 and the creel 10 that is independent of the current position of the laying head 8. By this means in particular the guidance of the creel 10 at a small and constant distance a from the laying head 8 is made possible, as is an optimal alignment of the fibre tapes 4 relative to the laying head 8, and a simple changeover of creels. The distance a between the creel 10 and the laying head 8 corresponds to an open length of fibre tapes 2, i.e. without any guides, between the creel 10 and the laying head 8.

In the embodiment shown here the positioning device 22 associated with the creel is connected to a surrounding section located above the positioning device 20 associated with the laying head.

Here the positioning device 20 of the laying head 8 has a base 24, a pivot arm 26 hinged on the base 24, and a rotary head 28 mounted on the free end of the pivot arm 26. The rotary head 28 accommodates, via a rotary plate 30, the laying head mounting 16 and thus the laying head 8. For purposes of laying down the fibre tapes 2 on the surface 4 in accordance with the predetermined trajectories, the base 24 can be traversed at least linearly in the x-direction in terms of the coordinates system, and thus parallel to the moulding tool 6. Additionally, the base 24 can, for example, also be mounted on a cross table, and can thus be similarly traversed linearly in the y-direction, and thus in the direction of the moulding tool 6. The pivot arm 26 can be pivoted about a pivot axis 32 extending in the x-direction. The rotary head 28 can be rotated at least about an axis of rotation 34 running parallel to the pivot axis. The rotary plate 30 can be rotated about a transverse axis 36 orthogonal to the axis of rotation of the rotary head 28.

The positioning device 22 here has two pivot arms 38, 40, which are arranged between a base 42 and a rotary head 44 with a rotary plate 46 and are connected in a jointed manner with one another. By means of the pivot arms 38, 40 alterations can be made in the distance in the y-direction between the creel 10 and the moulding tool 6, i.e. the laying head 8. The base 42 can be traversed linearly in the x-direction in terms of the coordinates system, and thus parallel to the moulding tool 6. In addition the base 42 can be pivoted about a vertical axis 48 extending in the z-direction. In addition the base 42 can, for example, also be mounted on a cross table, and thus can similarly be traversed linearly in the y-direction, and thus in the direction of the moulding tool 6. By virtue of the option of rotating the base 42 about the vertical axis 48, the pivot arm 38 associated with the base can be pivoted about a pivot axis 50 in an x-y plane. The pivot arm 40 associated with the rotary head can be pivoted, via a joint axis 42 running parallel to the pivot axis 50, relative to the pivot arm 38 associated with the base. The rotary head 44 can be rotated at least about an axis of rotation 54 running parallel to the pivot axis 50 and the joint axis 52. The rotary plate 46 can be rotated about a transverse axis 56 orthogonal to the axis of rotation 54 of the rotary head 44.

In the course of the automated laying down of the fibre tapes 2 on the surface 4, the positioning device 22 accommodating the creel 10 is controlled such that it tracks the movements of the laying head for purposes of laying down the fibre tapes 2 at a constant or near-constant distance. As seen from the surface 6, the creel 10 is arranged immediately behind the laying head 8, as a result of which a distance a, and thus an open length of the fibre tapes 2 between the creel 10 and the laying head 8, is minimised. The position of the creel 10 relative to the laying head 8 is ideally not altered, so that the fibre tapes 2 are not only supplied at a constant distance a, but also at an optimum alignment to the laying head 8.

Disclosed is a laying down device for the automated laying down of fibre tapes on a surface, wherein a creel is arranged on an independent positioning device that can be individually traversed in three dimensions, and tracks the movements of a laying head. Also disclosed is a laying method.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A laying device for the automated laying down of fibre tapes on a surface, wherein a laying head mounting is arranged on a first positioning device for accommodating a laying head, the laying device comprising:
   a creel;
   a creel mounting for accommodating the creel; and
   an individually controllable and traversable second positioning device comprising a jointed arm robot on which the creel is accommodated by means of which the movements of the laying head mounting can be tracked, wherein the second positioning device has at least one more degree of freedom than the first positioning device.

2. The laying device in accordance with claim 1, wherein the second positioning device has a plurality of creel mountings.

3. The laying device in accordance with claim 1 further comprising independently controllable second positioning devices on which a plurality of creel mountings are arranged.

4. The laying device in accordance with claim 1 further comprising a changeover device for automatically changeover of at least one creel.

5. The laying device in accordance with claim 1, wherein the creel mounting can be traversed into a changeover position.

6. A method for automated laying down of fibre tapes on a surface by controlling a laying device according to claim 1, the method comprising:
- arranging a laying head and a creel on individually controllable head and creel positioning devices, respectively; and
- tracking movements of the laying head with the creel and creel positioning device.

7. A laying device for automated laying down of fibre tapes on a surface, the laying device comprising:
- a laying head for applying the fibre tapes to the surface;
- a laying head mounting that mounts the laying head to an individually controllable and traversable head positioning device;
- a creel; and
- a creel mounting that mounts the creel to an individually controllable and traversable creel positioning device that comprises a jointed arm robot, the creel positioning device facilitating tracking of movements of the laying head, wherein the creel positioning device has at least one more degree of freedom than the head positioning device.

8. The laying device in accordance with claim 7, further comprising an additional independently controllable and traversable creel positioning device on which an additional creel mounting is arranged; and
a changeover device for automatic changeover of at least one creel.

* * * * *